US010095816B2

(12) United States Patent
Pond

(10) Patent No.: US 10,095,816 B2
(45) Date of Patent: Oct. 9, 2018

(54) APPARATUS AND METHOD FOR TRANSFORMING A COORDINATE SYSTEM TO SIMULATE AN ANISOTROPIC MEDIUM

(71) Applicant: Lumerical Computational Solutions, Inc., Vancouver (CA)

(72) Inventor: James Frederick Pond, Vancouver (CA)

(73) Assignee: Lumerical Inc., Vancouver (CA)

( * ) Notice: Subject to any disclaimer, the term of this patent is extended or adjusted under 35 U.S.C. 154(b) by 961 days.

(21) Appl. No.: 14/402,493

(22) PCT Filed: May 23, 2013

(86) PCT No.: PCT/CA2013/050391
§ 371 (c)(1),
(2) Date: Nov. 20, 2014

(87) PCT Pub. No.: WO2013/173921
PCT Pub. Date: Nov. 28, 2013

(65) Prior Publication Data
US 2015/0142397 A1    May 21, 2015

Related U.S. Application Data

(60) Provisional application No. 61/650,774, filed on May 23, 2012.

(51) Int. Cl.
*G06F 17/10* (2006.01)
*G06F 17/50* (2006.01)
(Continued)

(52) U.S. Cl.
CPC ....... *G06F 17/5009* (2013.01); *G02B 5/3083* (2013.01); *G02F 1/137* (2013.01); *G06F 2217/16* (2013.01)

(58) Field of Classification Search
CPC .................................................. G06F 17/5018
See application file for complete search history.

(56) References Cited

U.S. PATENT DOCUMENTS

2008/0077367 A1    3/2008  Odajima
2011/0270593 A1*  11/2011  Meuris ............... G06F 17/13
                                                    703/2
2012/0195068 A1*   8/2012  Erchak ................ B82Y 20/00
                                                    362/606

FOREIGN PATENT DOCUMENTS

WO        0077694 A1    12/2000

OTHER PUBLICATIONS

Wang et al., "Nonvanishing Anisotropic Magnetoresistance in Rashba Two-Dimensional Electron Systems with Nonmagnetic Disorders" (Nov. 4, 2009), pp. 1-6 [retrieved from https://arxiv.org/pdf/0911.0732.pdf].*

(Continued)

*Primary Examiner* — Brian W Wathen
(74) *Attorney, Agent, or Firm* — Bret J. Slaney; Blake, Cassels & Graydon LLP

(57) ABSTRACT

A method and apparatus for simulating a mesh element of an anisotropic medium are provided. A unitary transformation is applied to an initial coordinate system of the mesh element by a transformation module to produce a transformed reference coordinate system of the mesh element. Maxwell's equations for the mesh element are solved by an update generation module using computational methods to obtain an electric field tensor and an electric displacement field tensor within the mesh element. A unitary transformation to the electric field tensor and the electric displacement tensor are performed by a transformation module to calculate a corresponding electric field tensor and electric displacement tensor for the mesh element in the initial coordinate system.

16 Claims, 4 Drawing Sheets

(51) Int. Cl.
*G02F 1/137* (2006.01)
*G02B 5/30* (2006.01)

(56) References Cited

OTHER PUBLICATIONS

Hao et al., "FDTD Modeling of Metamaterials: Theory and Applications" (2009), Artech House, Inc., pp. 1-17, 67-88, 269-274, and 294-297.*
Wikipedia, "Permittivity" (Mar., 22 2012), pp. 1-12 [retrieved from https://en.wikipedia.org/w/index.php?title=Permittivity&oldid=483369053].*
Wikipedia, "Tensor". (May 16, 2012), pp. 1-20 [retrieved from https://en.wikipedia.org/w/index.php?title=Tensor&oldid=492860092].*
Hao et al., "FDTD Modeling of Metamaterials: Theory and Applications" (2009), Artech House, Inc., pp. 307-346.*
Okada, N. et al.: FDTD Modeling of a Cloak with a Nondiagonal Permittivity Tensor; International Scholarly Research Network, ISRN Optics, vol. 2012, Feb. 13, 2012; article ID 536209; Retrieved from the Internet: Aug. 28, 2013.
Cooke, S.J. et al.: CTLSS—An Advanced Electromagnetic Simulation Tool for Designing High-Power Microwave Sources; IEEE Transactions on Plasma Science, vol. 28, No. 3, Jun. 2000, pp. 841-866; Retrieved from the Internet: Aug. 28, 2013.
Remes, Coneliu; International Search Report from corresponding PCT Application No. PCT/CA2013/050391; search completed on Aug. 29, 2013.
Gurpreet Singh, Eng Leong Tan, Zhi Ning Chen, "A Split-Step FDTD Method for 3-D Maxwell's Equations in General Anisotropic Media", IEEE Transactions on Antennas and Propagation, Nov. 2010, pp. 3647-3657, vol. 58, Issue No. 11, IEEE.
Ardavan F. Oskooi, Chris Kottke, Steven G. Johnson, "Accurate finite-difference time-domain simulation of anisotropic media by subpixel smoothing", Optics Letters, Sep. 15, 2009, pp. 2778-2780, vol. 34, Issue No. 18, Optical Society of America.
Gregory R. Werner, John R. Cary, "A stable FDTD algorithm for non-diagonal, anisotropic dielectrics", Journal of Computational Physics, 2007, pp. 1085-1101, vol. 226, Issue No. 1, Elsevier Inc.
John Schneider, Scott Hudson, "The Finite-Difference Time-Domain Method Applied to Anisotropic Material", IEEE Transactions on Antennas and Propagation, Jul. 1993, pp. 994-999, vol. 31, Issue No. 7, IEEE.
Kane S. Yee, "Numerical Solution of Initial Boundary Value Problems Involving Maxwell's Equations in Isotropic Media", IEEE Transactions on Antennas and Propagation, May 1996, pp. 302-307, vol. 14, Issue No. 3, IEEE.

* cited by examiner

APPARATUS AND METHOD FOR TRANSFORMING A COORDINATE SYSTEM TO SIMULATE AN ANISOTROPIC MEDIUM

CROSS-REFERENCE TO RELATED APPLICATIONS

This application is a U.S. National Stage Filing under 35 U.S.C. 371 from International Application No. PCT/CA2013/050391 filed on May 23, 2013, which claims priority from U.S. Provisional Application No. 61/650,774, filed on May 23, 2012, the entire contents of which are incorporated herein by reference.

TECHNICAL FIELD

The following relates generally to the simulation of an anisotropic medium.

BACKGROUND

It is desirable to solve Maxwell's equations for various electric and magnetic media using the finite-difference time-domain (FDTD) method to simulate electromagnetic properties of the media. The FDTD method involves spatially discretizing the volume of the medium being simulated to form a mesh of individual elements. The individual elements can be referred to as mesh cells or Yee cells. The FDTD method is routinely used to simulate isotropic materials.

It can also be desirable to also solve equations involving anisotropic media to model the electrical and magnetic properties of media in various systems and devices. For example, it may be desirable to simulate the electromagnetic properties of liquid crystals in the conception, design, and testing of liquid crystal displays (LCDs) and electrical drivers. However, anisotropy complicates the solution of Maxwell's equations using the FDTD method.

Solving Maxwell's equations in anisotropic materials enables the simulation of electromagnetic properties of device designs comprising such materials. However, simulation of anisotropic materials can be complicated by spatially varying permittivity. For example, liquid crystal modeling can be challenging in cases where the orientation of liquid crystal molecules is a function of three-dimensional space.

The simulation of electromagnetic properties is also complicated in cases where at least some of the terms in the permittivity tensor are dispersive. These terms may be approximated by FDTD models including Plasma-Drude, Lorentz, Debye and more general multi-pole expansion dispersive models.

Although attempts have been made to overcome the above deficiencies, these have focused on sub-element smoothing or conformal mesh algorithms to reduce the number of errors that occur at interfaces between different media on the finite sized mesh used in the simulation. Solving Maxwell's equations in the simulation of electromagnetic properties of general dispersive, anisotropic, spatially varying media remains difficult due to challenges in computing numerical solutions to Maxwell's equations.

It is an object of the present invention to mitigate or obviate at least one of the above disadvantages.

SUMMARY

In one aspect, a computer-implemented method of simulating predefined properties of a mesh element defined by an initial reference frame of an anisotropic medium is provided. The method comprises generating a transformed reference frame of the mesh element by applying a unitary transformation to the initial reference frame, the unitary transformation for diagonalizing a permittivity tensor associated with the medium and utilizing the unitary transformation to generate a transformed electric field tensor and an electric displacement field tensor in the transformed reference frame based on an electric field tensor and an electric displacement field tensor of the medium in the initial reference frame. The transformed electric field tensor and the transformed electric displacement field tensor for the mesh element are updated to obtain the predefined properties based on the diagonalized permittivity tensor.

In another aspect, a method of transforming a coordinate system of an anisotropic medium is provided. The method comprises applying a unitary transformation to diagonalize a permittivity matrix attributed to the medium.

In yet another aspect, there is provided an apparatus for simulating predefined properties of a mesh element defined by an initial reference frame of an anisotropic medium. The apparatus comprises a transformation module operable to generate a transformed reference frame of the mesh element by applying a unitary transformation to the initial reference frame, the unitary transformation for diagonalizing a permittivity tensor associated with the medium, and an update generation module operable to utilize the unitary transformation to generate a transformed electric field tensor and an electric displacement field tensor in the transformed reference frame based on an electric field tensor and an electric displacement field tensor of the medium in the initial reference frame. The update generation module is further operable to update the transformed electric field tensor and the transformed electric displacement field tensor for the mesh element to obtain the predefined properties based on the diagonalized permittivity tensor.

In yet another aspect, there is provided apparatus for transforming a coordinate system of an anisotropic medium comprising a transformation module operable to apply a unitary transformation to diagonalize a permittivity matrix attributed to the medium.

The unitary transformation may be applied to the initial reference frame to align the transformed reference frame with an anisotropic axis of the medium.

The inverse of the unitary transformation may be applied to the updated electric field tensor and electric displacement field tensor to generate a corresponding electric field tensor and electric displacement field tensor for the mesh element in the initial reference frame for subsequent comparison with the mesh element with one or more other mesh elements in the initial reference frame.

The unitary transformation may be applied to each of a plurality of mesh elements of the medium. The initial coordinate system may be a global coordinate system. The global coordinate system may be common to each of the mesh elements. The transformed reference coordinate system may be a local coordinate system. The mesh element may be represented by a Yee cell.

BRIEF DESCRIPTION OF THE DRAWINGS

Embodiments will now be described by way of example only with reference to the appended drawings wherein.

DETAILED DESCRIPTION OF THE DRAWINGS

Figure 1:
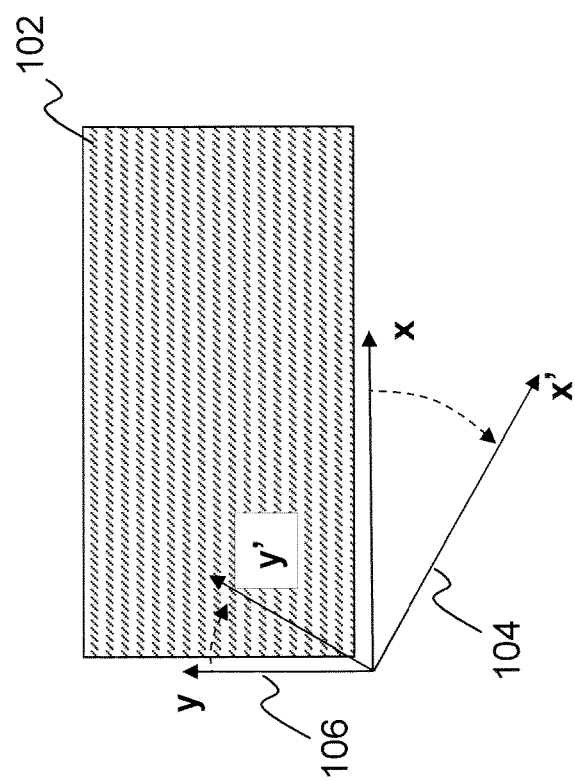
FIG. 1 is a two dimensional representation of an anisotropic medium.

Embodiments will now be described with reference to the figures. It will be appreciated that for simplicity and clarity of illustration, where considered appropriate, reference numerals are repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by an application, module, or both. Any such computer storage media may be part of the device or accessible or connectable thereto. Any application or module herein described may be implemented using computer readable/executable instructions that may be stored or otherwise held by such computer readable media.

A system and method for transforming a coordinate system to simulate predetermined properties of anisotropic media is provided. In one aspect, the method provides numerical solutions of Maxwell's equations for anisotropic dispersive media defined by a global coordinate system. The method provides numerical solutions by transforming a local reference frame of each element to align with the axis of the anisotropic medium being modeled. Numerical solutions are computationally less expensive when the reference frame of the computation is aligned with the axis of the anisotropic medium, as is further described herein.

In another aspect, an apparatus comprising a transformation module is provided for solving Maxwell's equations for anisotropic media. In some examples, the anisotropic media is dispersive. The system enables the computation of numerical solutions of Maxwell's equations for anisotropic dispersive media in a simulation to obtain predetermined properties of the medium. Predetermined properties of the anisotropic medium include, for example, the electric field, electric displacement field, magnetic field, and magnetic flux density of the medium. The anisotropic and dispersive properties of the media are, in some cases, spatially dependent. For example, the anisotropic and dispersive properties of the media may vary discretely or continuously over the media.

The method comprises transforming a local coordinate system of an anisotropic medium to a reference frame in which a matrix representing the permittivity of the medium is a diagonal matrix. Once the transformation is complete, Maxwell's equations can be solved using various dispersive models to simulate predetermined properties of dispersive anisotropic media.

Simulation of electromagnetic properties can be complicated by non-diagonal terms in the electric permittivity and magnetic permeability tensors of the material being studied. For example, non-diagonal terms arise when the axis of a polarizing filter in an LCD is not aligned with the axis of the liquid crystal. An example medium is a liquid crystal display (LCD) defined by a global coordinate system and comprising a plurality of mesh elements that are approximately identical in construction, each being defined by a local coordinate system that is initially aligned with the global coordinate system. The matrix representing the permittivity of the medium is diagonal when the coordinate system is aligned with the axis of the anisotropic medium, for example, the molecular axis of a liquid crystal molecule.

Figure 2:
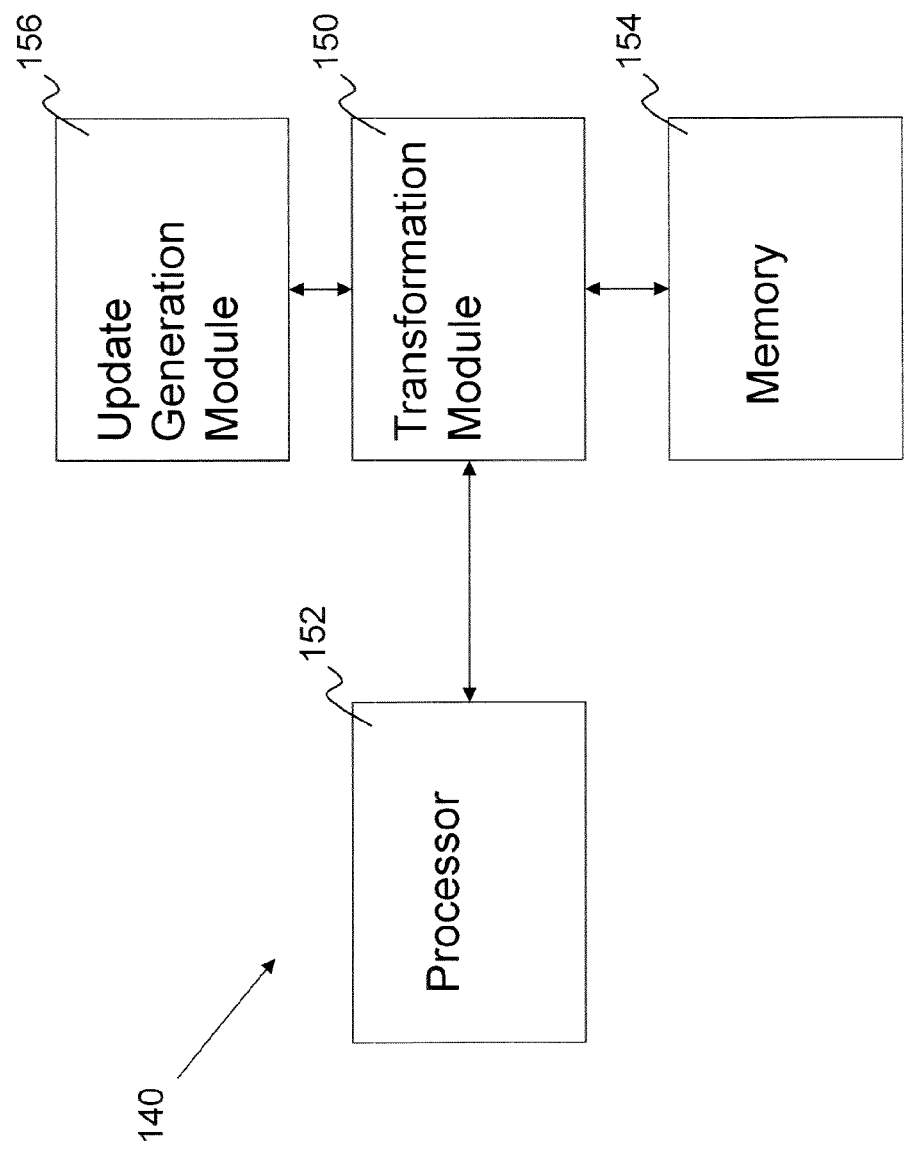
FIG. 2 is an example block diagram of a system according to the present invention.

A transformation module 150, as shown in FIG. 2, is operable to transform the local coordinate system to diagonalize the matrix by aligning the local coordinate system with the axis of the anisotropic medium. The local coordinate system is also referred to herein as a local reference frame.

When the local coordinate system at each mesh element is aligned with the molecular axis of the liquid crystal, Maxwell's equations can be solved more readily, as non-diagonal terms in the permittivity tensor disappear. In the case of an LCD, the permittivity of each mesh element is substantially identical, allowing the application of a common dispersive material model for each mesh element in the LCD when solving Maxwell's equations. Upon solving Maxwell's equations, the transformation module may optionally transform the local reference frame to align the local reference frame with a global reference frame.

Referring to FIG. 1, an example anisotropic medium 102 is shown. For illustrative purposes, FIG. 1 is shown in two dimensions, however, it will be appreciated that the concepts presented herein will be equally applicable to three dimensional media.

The medium 102 may, for example, comprise birefringent liquid crystal molecules oriented along a particular axis. The permittivity of the medium 102 depends on the relative orientation of the electromagnetic field interacting with the medium. The medium 102 can be assigned a global reference frame used to describe the properties of the media. The media can then be discretized into a plurality of elements and each of these discrete elements can be assigned an individual local reference frame.

The local reference frame may align with the global reference frame, the global reference frame being consistent across all elements. A local reference frame aligned with the global reference frame is represented by numeral 106 prior to transformation. As is shown in FIG. 1, the local reference frame is transformed from alignment with the global reference frame to be in alignment with the axis of the medium 102. The transformed reference frame is represented by numeral 104.

Turning now to FIG. 2, a simulation apparatus 140 is provided for simulating predetermined properties of anisotropic media. The simulation apparatus 140 comprises a transformation module 150, which comprises, or is linked to, a processor 152 and a memory 154. The transformation module 150 is also in communication with an update generation module 156.

The transformation module 150 is operable to perform coordinate reference frame transformations on one or more mesh elements. The transformation module 150 is operable to transform the local reference frame of an element in a model to align the local reference frame with the axis of a medium, as is further described below. For example, the transformation module is operable to perform the coordinate transformation shown in FIG. 1. The transformation module 150 is also operable to transform the local reference frame to be re-aligned with a global reference frame.

The update generation module 156 is operable to generate solutions to the Maxwell equations for one or more mesh elements in a transformed reference frame, as is described in detail below with reference to FIGS. 3 and 4.

The transformation module 150 transforms the local reference frame through a unitary transformation to diagonalize the permittivity tensor. Since the transformation module 150 performs a unitary transformation, any properties of the permittivity tensor matrix that enable numerical stability when solving Maxwell's equations can be retained. The unitary transformation may be real or complex while retaining properties of the permittivity tensor.

For example, properties that can be retained under a unitary transformation include a positive definite matrix will remain positive definite and a Hermitian matrix will remain Hermitian. The use of a unitary transformation enables a simulation of a system that is stably solved by FDTD in its original reference frame to remain stable in the transformed reference frame.

Upon the transformation module 150 transforming the local coordinate system of the matrix, the update generation module 156 employs the finite difference time domain (FDTD) method to solve Maxwell's equations. In general, the FDTD method is well known in the art. Briefly, the inverse permittivity tensor converts the electric displacement field to the electric field. Similarly, the inverse permeability tensor converts the magnetic flux density to the magnetic field in magnetic field calculations.

Figure 3:
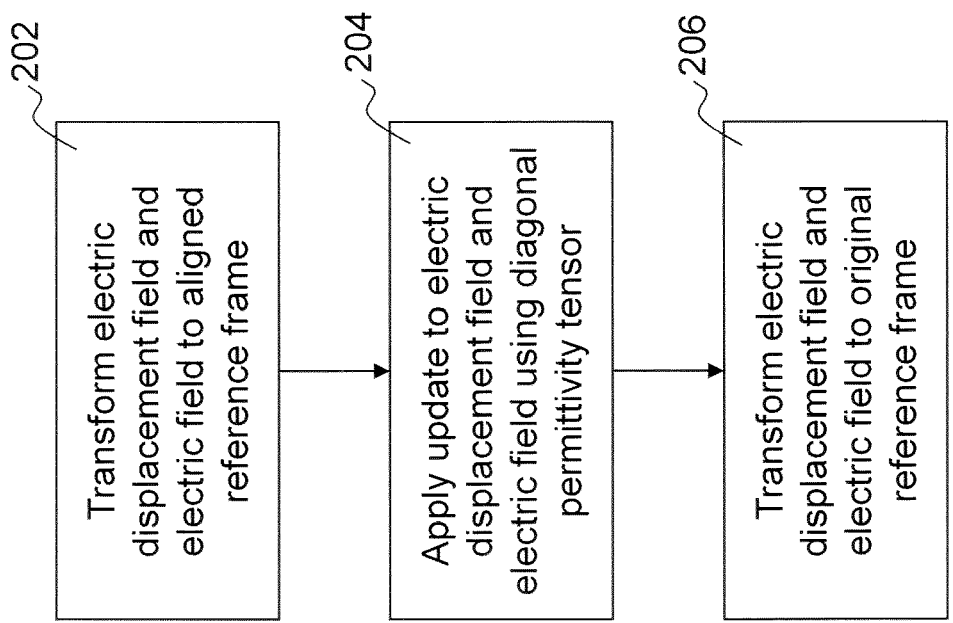
FIG. 3 is a flow chart illustrating an example method of solving the Maxwell equations.
Figure 4:
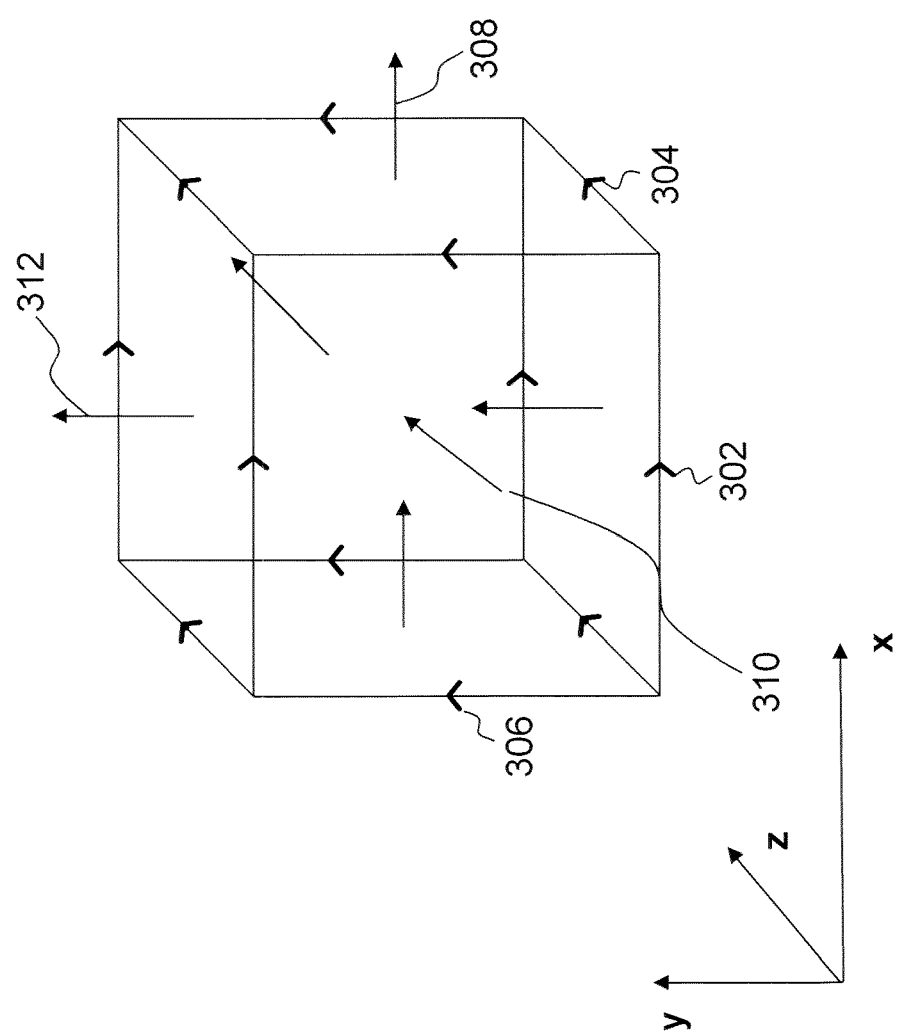
FIG. 4 is an example diagram of a Yee cell.

Referring to FIG. 3, a process flow of predetermined properties of an anisotropic medium being simulated is provided. The transformation module 150 first transforms the local reference frame to align the local reference frame with the axis of the anisotropic medium being simulated, as is represented by 202. This causes the permittivity tensor to be diagonal, thereby simplifying calculations conducted by the update generation module 156. In 204, the update generation module 156 solves the Maxwell equations to determine the electric displacement field and electric field based on the diagonalized permittivity tensor. The solution of the Maxwell equations will be described in further detail below. In 206, the transformation module 150 optionally transforms the electric displacement field and the electric field back to the global reference frame to enable further calculations to simulate the medium.

Since electrical properties of a medium affect the magnetic properties of a medium and vice versa, one example implementation of the FDTD method is to alternate between solving the electric field and the magnetic field of the medium in question to simulate either the electrical, magnetic, or both, properties of the medium. The electric field and magnetic field can be solved iteratively and alternately according to the following equations:

$$\frac{\partial \vec{D}(t)}{\partial t} = \vec{\nabla} \times \vec{H}(t)$$

$$\vec{D}(\omega) = \varepsilon(\omega)\vec{E}(\omega)$$

$$\frac{\partial \vec{B}(t)}{\partial t} = -\vec{\nabla} \times \vec{E}(t)$$

$$\vec{B}(\omega) = \mu(\omega)\vec{H}(\omega)$$

Where $\vec{D}$ is the electric displacement field, $\vec{E}$ is the electric field, $\vec{B}$ is the magnetic flux density and $\vec{H}$ is the magnetic field, $\varepsilon$ is the electric permittivity tensor $\mu$ is the magnetic permeability tensor, $\omega$ is the angular frequency, and t is time. The electric permittivity and magnetic permeability tensors must be symmetric and positive semidefinite or positive definite when using the FDTD method to allow for numerical stability.

The electric permittivity tensor, magnetic permeability tensor, electric field and magnetic field are complex in the frequency domain but are often real-valued in the time domain. An exception to this is when solving the magneto optical effect of an anisotropic dispersive material, complex values can be used for the electric permittivity tensor and electromagnetic fields in the time domain. In this case, the permittivity are Hermitian and positive semidefinite or positive definite. When $\varepsilon$ and $\mu$ are dispersive and complex valued in the frequency domain, various material models well known in the field are used to solve the equations in the time domain using real valued E and H fields. These material models may solve for Plasma-Drude, Lorentz, and Debye and more general multi-pole dispersive materials.

As outlined above, the electric field and magnetic field equations can be iteratively and alternately solved to determine the electromagnetic properties of the medium being simulated. In the example of an LCD comprising a plurality of identical mesh elements, these equations can be solved using the same material model, with the same parameters, for each mesh element of the liquid crystal material upon the transformation module 150 transforming the reference frame.

Although the following is described with reference to solving for the electric field equation, the same principles may be applied to the magnetic field domain. As mentioned above, U is a unitary transformation $U^{-1}=U^\dagger$, where $U^\dagger$ is the complex conjugate transpose of U. As mentioned above, the use of a unitary transformation by the transformation module 150 preserves the stability in the numerical computation. The transformation module 150 is operable to transform the electric field (E), electric displacement field (D), and the permittivity ($\varepsilon$) according to the following:

$$\vec{D}'=U^\dagger \vec{D}$$

$$\vec{E}'=U^\dagger \vec{E}$$

$$\varepsilon'=U^\dagger \varepsilon U$$

The relationship between the electric displacement field and the electric field is preserved in the transformed reference frame according to the following:

$$\vec{D}=\varepsilon \vec{E}=UU^\dagger \varepsilon UU^\dagger \vec{E}$$

$$U^\dagger \vec{D}=\varepsilon' U^\dagger \vec{E}$$

$$D'=\varepsilon' E'$$

The unitary matrix U can be constructed from column eigenvectors of $\varepsilon$, rendering $\varepsilon'$ a diagonal matrix (i.e. a square matrix having no terms outside its diagonal). By definition, a diagonal matrix does not include non-diagonal terms. A matrix with only diagonal terms can be manipulated more easily and with fewer computational steps using FDTD. For example, the manipulations may comprise manipulations that are commonly used for materials with only a diagonal permittivity or permeability tensor.

For example, the manipulation $\vec{E} = \varepsilon^{-1}\vec{D}$ may also be written as: $\vec{E} = U(\varepsilon')^{-1}U^\dagger\vec{D}$. Because the transformation is unitary, $(\varepsilon')^{-1}$ will be numerically stable, as it will have the same properties as $\varepsilon^{-1}$ that ensures numerical stability.

Iterations of the FDTD method can be implemented according to FIG. 3. In 202, the transformation module 150 transforms the displacement and electric fields D' and E' to a local coordinate system according to:

$$\vec{D}' = U^\dagger \vec{D}$$

$$\vec{E}' = U^\dagger \vec{E}$$

In 204, the update generation module 156 solves the Maxwell equations for D' and E' using $\varepsilon'$ of the material. It will be appreciated that $\varepsilon'$ may comprise a dispersive permittivity or a nonlinear permittivity. The equation can, for example, be of the form: $\vec{E}' = (\varepsilon')^{-1}\vec{D}$, however this depends on the precise form may depend on the type of FDTD update. Due to the transformation, the same update normally used for diagonal permittivity updates can be applied.

In 206, the transformation module 150 transforms the generated tensors associated with the electric displacement field and the electric field into the global reference frame. The electric displacement field and electric field can be solved for the global reference frame according to the equations:

$$\vec{D} = U\vec{D}'$$

$$\vec{E} = U\vec{E}'$$

The remaining curl equations can then be solved without modification. The transformation in steps 202 and 206 allow the standard FDTD updates for diagonal media to be used.

Each finite element may optionally be represented by a Yee cell. The Yee lattice represented by FIG. 4 enables the electric field vectors to be spatially separated from the magnetic field vectors, which can simplify the update performed by the update generation module 156 in block 204 of FIG. 3. As is shown in FIG. 4, the Yee lattice comprises an electric field element for each dimension and a separate magnetic field element for each dimension. Specifically, 302, 304, and 306 are electric field elements for the x, z, and y axis respectively, whereas 308, 310, and 312, are magnetic field element for each of the x, z, and y axis respectively.

A mesh comprising a Yee cell lattice enables the calculation of the electric field updates and the magnetic field updates to be staggered such that the curl equations can be solved in a numerically efficient way. In addition, the electric field (E) and magnetic field (H) updates can be staggered in time to solve Maxwell's equations. Although a Yee cell is represented in FIG. 4, other cell representations may otherwise be used.

Using Yee cells or other cells having separated magnetic field and electric field components can reduce the computational power required to simulate a medium using FDTD methods.

For example, when solving three-dimensional equations, each Yee cell comprises three electric field elements and three magnetic field elements. Therefore, if there are two Yee cells in a simulation, both the electric fields and magnetic fields in the Yee cells would be described by six elements. Simulations might comprise hundreds or thousands or more of Yee cells. Both the electric field and magnetic field in a simulation comprise 3n elements, where n is the number of Yee cells.

In the FDTD method, the permittivity operator, or inverse permittivity operator, relates the 3n components of the displacement field to the 3n components of the electric field.

The general permittivity update, which may be applied by the update generation module 156, is shown below:

$$\begin{pmatrix} D^x_{1,1,1} \\ D^y_{1,1,1} \\ D^z_{1,1,1} \\ D^x_{2,1,1} \\ D^y_{2,1,1} \\ D^z_{2,1,1} \\ \cdots \\ D^x_{nx,ny,nz} \\ D^y_{nx,ny,nz} \\ D^z_{nx,ny,nz} \end{pmatrix} = \varepsilon \begin{pmatrix} E^x_{1,1,1} \\ E^y_{1,1,1} \\ E^z_{1,1,1} \\ E^x_{2,1,1} \\ E^y_{2,1,1} \\ E^z_{2,1,1} \\ \cdots \\ E^x_{nx,ny,nz} \\ E^y_{nx,ny,nz} \\ E^z_{nx,ny,nz} \end{pmatrix}$$

where i, j, and k represent the position of the corresponding Yee cell on the 3D FDTD mesh. When solving for isotropic or diagonal anisotropic media the permittivity or permeability tensor is diagonal when the reference frame is aligned with the axis of the anisotropic medium. To solve for the more general anisotropy, it may be computationally efficient to use a block diagonal form of the permittivity tensor, as shown below:

$$\begin{pmatrix} D^x_{1,1,1} \\ D^y_{1,1,1} \\ D^z_{1,1,1} \\ D^x_{2,1,1} \\ D^y_{2,1,1} \\ D^z_{2,1,1} \\ \cdots \\ D^x_{nx,ny,nz} \\ D^y_{nx,ny,nz} \\ D^z_{nx,ny,nz} \end{pmatrix} = \begin{pmatrix} \begin{pmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{pmatrix}_{1,1,1} & 0 & \cdots & 0 \\ 0 & \begin{pmatrix} \varepsilon_{xx} & \varepsilon_{xy} & \varepsilon_{xz} \\ \varepsilon_{yz} & \varepsilon_{yy} & \varepsilon_{yz} \\ \varepsilon_{zx} & \varepsilon_{zy} & \varepsilon_{zz} \end{pmatrix}_{2,1,1} & \cdots & 0 \\ \cdots & \cdots & \cdots & \cdots \\ 0 & 0 & \cdots & \begin{pmatrix} \varepsilon_{xx} & \varepsilon_{xy} & \varepsilon_{xz} \\ \varepsilon_{yz} & \varepsilon_{yy} & \varepsilon_{yz} \\ \varepsilon_{zx} & \varepsilon_{zy} & \varepsilon_{zz} \end{pmatrix}_{nx,ny,nz} \end{pmatrix} \begin{pmatrix} E^x_{1,1,1} \\ E^y_{1,1,1} \\ E^z_{1,1,1} \\ E^x_{2,1,1} \\ E^y_{2,1,1} \\ E^z_{2,1,1} \\ \cdots \\ E^x_{nx,ny,nz} \\ E^y_{nx,ny,nz} \\ E^z_{nx,ny,nz} \end{pmatrix}$$

Although the block diagonal form may simplify the field updates, a spatial asymmetry is introduced due to the location of the electric and magnetic field vectors in each Yee cell.

As was mentioned above and illustrated in FIG. 4, each Yee cell comprises three magnetic field elements and three electric field elements, none of which at exactly the same location. Iteratively updating the electric and magnetic fields according to the above equation introduces a bias from the resulting magnetic and electric fields in the Yee cell.

However, this bias can be overcome using several methods. For example, the update generation module 156 could employ various unitary transformation interpolation approaches to transform neighbouring Yee cells, however, this approach would be likely to introduce non-diagonal terms in the permittivity in such a way that it would be challenging to find a convenient block diagonal form, thereby complicating the solution of the electric field and magnetic field updates described above.

Another approach to mitigate the bias is for the update generation module 156 to average several updates of the electric field and magnetic field alternating between the neighbouring cell on a first side of each Yee lattice and a neighbouring cell on a second side of each Yee lattice. For example, the update generation module 156 is operable to update the electric field using the average of several independent unitary transformations of the electric displacement field. For example the update generation module 156 is operable to employ following relationship to mitigate or eliminate the bias induced by using a particular block diagonal form of the permittivity.

$$\vec{E} = \frac{1}{N}\sum_{i=1}^{N}\vec{E}_i = \frac{1}{N}U_i\vec{E}_i' = \frac{1}{N}\sum_{i=1}^{N}U_i(\varepsilon')^{-1}\vec{D}_i' = \left(\frac{1}{N}\sum_{i=1}^{N}U_i(\varepsilon')^{-1}U_i^{\dagger}\right)\vec{D}$$

Taking the mean of the inverse permittivity term according to:

$$\left(\frac{1}{N}\sum_{i=1}^{N}U_i(\varepsilon')^{-1}U_i^{\dagger}\right)$$

retains the properties of the individual permittivity tensors. Specifically, the average permittivity tensor will be symmetric, positive semidefinite, definite, or Hermitian as each inverse permittivity vector. By the update generation module 156 averaging over individual permittivity tensors, the spatial bias can be eliminated entirely to preserve the spatial symmetry of the magnetic and electric fields. However, the computational requirements are minimized since each individual permittivity can be written in block diagonal form.

Although the above is described with reference to linear materials, a person skilled in the art would recognize that the same concepts could be extended to simulations of nonlinear materials. Despite the stability conditions of a nonlinear FDTD simulation potentially being more difficult to satisfy, the stability conditions would not be made more complicated by performing the unitary coordinate transformation. Transformation of the coordinate system will not, in other words, negatively impact the stability of a simulation of a nonlinear medium.

Furthermore, although the above was described in the context of solving Maxwell's equations using the FDTD method, the same approach can be used to obtain other time domain and frequency domain solutions of Maxwell's equations. For example, the method as described herein can be applied to systems wherein all the electromagnetic field components are known at the same spatial location (i.e. spatial elements were not represented by a Yee cell or other spatially separated representation). This can simplify the application of local coordinate transformations by removing the need to position the field components on a Yee cell or other similar cell typically used in FDTD simulations.

In most examples, it is advantageous to diagonalize the permittivity and permeability tensors to solve Maxwell's equations, as this can significantly reduce the number of computation steps required and can further obviate the need to use grid smoothing techniques. The unitary transformation method described herein also simplifies the transformation between coordinate reference frames. This enables the transformation module 150 to transform the local coordinate system to a reference frame that simplifies or otherwise facilitates an update provided by the update generation module 156 to solve Maxwell's equations.

The transformation module 150 may optionally be operable to transform the coordinate system to yet another reference frame to perform additional calculations. For example, the transformation module 150 may transform the coordinate system to solve Ampere's law and Faraday's law in a reference frame consistent with a Cartesian mesh. Using the transformation method described above, the local coordinate system can be aligned with the Cartesian mesh without altering important properties of the tensors.

Generally, the unitary transformation can be used to transform the coordinate system into other advantageous reference frames. For example, in a simulation having a first medium in contact with a second medium, it may be difficult for an update generation module to solve Maxwell's equations along the interface. The transformation module 150 can apply a unitary transformation to the reference frame to align one of the axes of the coordinate system with the normal of the surface of the interface. The remaining two axes of a three dimensional coordinate system will therefore lie substantially parallel to the surface of the interface, simplifying the generation of updates to Maxwell's equations by an update generation module.

Although coordinate system transformations have been described with reference to specific examples, it will be understood that other coordinate system transformations are within the scope of the description. For example, the transformation module 150 may transform any coordinate system transformation to an updated reference frame to simplify or otherwise facilitate a computation provided by the update generation module 156.

The ability to perform local transformations enables distinct transformations to be applied to various areas of the medium. As mentioned above, this is particularly advantageous for LCD's where each element is aligned with the axis of the molecular axis of the liquid crystal at a particular location. The same material models can be applied to each mesh element, even if the orientation of individual liquid crystal molecules differs prior to the transformation. Because many LCD simulations involve millions of grid cells, this reduces the computational steps required to simulate these devices.

Time domain methods can be particularly challenging methods of solving for Maxwell's equations for dispersive media having non-diagonal terms in the permittivity tensor because the relationship between the electric displacement field and the electric field involve a convolution product in the time domain. Similarly, the relationship between the magnetic flux density and the magnetic field involves a convolution product in the time domain.

By way of example, $\vec{D}(\omega)=\varepsilon(\omega)\vec{E}(\omega)$ in the frequency domain becomes the convolution product:

$$\vec{D}(t) = \varepsilon(t) * \vec{E}(t) = \int_0^t \vec{E}(t')\varepsilon(t-t')dt'$$

in the time domain, this is significantly more difficult to compute numerically. Specifically, for non-diagonal anisotropic media, there are three times as many convolution products to solve.

However, a unitary transformation to change the reference frame and diagonalize the permittivity minimizes the number of convolution products to be solved by the update generation module 156. For example, a diagonalized matrix can have as little as a third of the number of convolution products that require a solution.

Importantly, for LCDs and other simulations where the diagonal permittivity tensor is uniform across several elements (e.g. Yee cells), the same update algorithm and parameters can be used to evaluate the convolution products across all elements upon the update generation module 156 solving for a single one of the plurality of identical elements.

I claim:

1. A computer-implemented method for simulating an electromagnetic property of a medium, the medium being meshed to define a plurality of mesh elements in an initial reference frame, the method comprising, for each mesh element:
   determining a unitary transformation at a transformation module having a processor configured for transforming an initial permittivity tensor in the initial reference frame into a transformed permittivity tensor in a transformed reference frame, the transformed permittivity tensor being diagonal;
   using a standard finite-difference time-domain (FDTD) process for simulating the electromagnetic property of the medium;
   while modifying the standard FDTD process by:
      applying the unitary transformation at the transformation module to an initial electric displacement field tensor in the initial reference frame to generate a transformed electric displacement field tensor in the transformed reference frame;
      communicating the transformed permittivity tensor, the transformed electric displacement field tensor and a transformed electric field tensor to an update generation module;
      generating an updated transformed electric field tensor at the update generation module according to the standard FDTD process, using the transformed permittivity tensor, the transformed electric displacement field tensor, and the transformed electric field tensor;
      communicating the updated transformed electric field tensor to the transformation module; and
      applying an inverse unitary transformation at the processor of the transformation module to the updated transformed electric field tensor to generate an updated initial electric field tensor in the initial reference frame; and
   using the updated electric field tensor in the initial reference frame in an update of the standard FDTD process while running the simulation.

2. The computer-implemented method according to claim 1, wherein applying the unitary transformation further comprises applying the unitary transformation at the transformation module to an initial electric field tensor in the initial reference frame to generate the transformed electric field tensor in the transformed reference frame.

3. The computer-implemented method according to claim 1, wherein applying the inverse unitary transformation further comprises applying an inverse unitary transformation at the transformation module to the transformed electric displacement field tensor.

4. The computer-implemented method according to claim 1, wherein the medium is anisotropic and the transformed reference frame is aligned with an anisotropic axis of the medium.

5. The computer-implemented method according to claim 1, wherein the initial reference frame is a global coordinate system.

6. The computer-implemented method according to claim 1, wherein the transformed reference frame is a local coordinate system.

7. The computer-implemented method according to claim 1, wherein each mesh element is a Yee cell.

8. A computer-implemented method for simulating an electromagnetic property of a medium, the medium being meshed to define a plurality of mesh elements in an initial reference frame, the method comprising, for each mesh element:
   determining a unitary transformation at a transformation module having a processor configured for transforming an initial permeability tensor in the initial reference frame into a transformed permeability tensor in a transformed reference frame, the transformed permeability tensor being diagonal;
   using a standard finite-difference time-domain (FDTD) process for simulating the electromagnetic property of the medium;
   while modifying the standard FDTD process by:
      applying the unitary transformation at the transformation module to an initial magnetic flux density tensor in the initial reference frame to generate a transformed magnetic flux density tensor in the transformed reference frame;
      communicating the transformed permeability tensor, the transformed magnetic flux density tensor and a transformed magnetic field tensor to an update generation module;
      generating an updated transformed magnetic field tensor at the update generation module according to the standard FDTD process, using the transformed permeability tensor, the transformed magnetic flux density tensor, and the transformed magnetic field tensor;
      communicating the updated transformed magnetic field tensor to the transformation module; and
      applying an inverse unitary transformation at the processor of the transformation module to the updated transformed magnetic field tensor to generate an updated initial magnetic field tensor in the initial reference frame; and
   using the updated magnetic field tensor in the initial reference frame in an update of the standard FDTD process while running the simulation.

9. The computer-implemented method according to claim 8, wherein applying the unitary transformation further comprises applying the unitary transformation at the transformation module to an initial magnetic field tensor in the initial reference frame to generate the transformed magnetic field tensor in the transformed reference frame.

10. The computer-implemented method according to claim 8, wherein applying the inverse unitary transformation further comprises applying an inverse unitary transformation at the transformation module to the transformed magnetic flux density tensor.

11. The computer-implemented method according to claim 8, wherein the medium is anisotropic and the transformed reference frame is aligned with an anisotropic axis of the medium.

12. The computer-implemented method according to claim 8, wherein the initial reference frame is a global coordinate system.

13. The computer-implemented method according to claim 8, wherein the transformed reference frame is a local coordinate system.

14. The computer-implemented method according to claim 8, wherein each mesh element is a Yee cell.

15. A non-transitory computer readable medium having stored thereon computer readable instructions for causing a processor to simulate an electromagnetic property of a medium, the medium being meshed to define a plurality of mesh elements in an initial reference frame, the computer readable medium comprising instructions for:
   determining a unitary transformation at a transformation module having a processor configured for transforming an initial permittivity tensor in the initial reference frame into a transformed permittivity tensor in a transformed reference frame, the transformed permittivity tensor being diagonal;
   using a standard finite-difference time-domain (FDTD) process for simulating the electromagnetic property of the medium;
   while modifying the standard FDTD process by:
      applying the unitary transformation at the transformation module to an initial electric displacement field tensor in the initial reference frame to generate a transformed electric displacement field tensor in the transformed reference frame;
      communicating the transformed permittivity tensor, the transformed electric displacement field tensor and a transformed electric field tensor to an update generation module;
      generating an updated transformed electric field tensor at the update generation module according to the standard FDTD process, using the transformed permittivity tensor, the transformed electric displacement field tensor, and the transformed electric field tensor;
      communicating the updated transformed electric field tensor to the transformation module; and
      applying an inverse unitary transformation at the processor of the transformation module to the updated transformed electric field tensor to generate an updated initial electric field tensor in the initial reference frame; and
   using the updated electric field tensor in the initial reference frame in an update of the standard FDTD process while running the simulation.

16. A non-transitory computer readable medium having stored thereon computer readable instructions for causing a processor to simulate an electromagnetic property of a medium, the medium being meshed to define a plurality of mesh elements in an initial reference frame, the computer readable medium comprising instructions for:
   determining a unitary transformation at a transformation module having a processor configured for transforming an initial permeability tensor in the initial reference frame into a transformed permeability tensor in a transformed reference frame, the transformed permeability tensor being diagonal;
   using a standard finite-difference time-domain (FDTD) process for simulating the electromagnetic property of the medium;
   while modifying the standard FDTD process by:
      applying the unitary transformation at the transformation module to an initial magnetic flux density tensor in the initial reference frame to generate a transformed magnetic flux density tensor in the transformed reference frame;
      communicating the transformed permeability tensor, the transformed magnetic flux density tensor and a transformed magnetic field tensor to an update generation module;
      generating an updated transformed magnetic field tensor at the update generation module according to the standard FDTD process, using the transformed permeability tensor, the transformed magnetic flux density tensor, and the transformed magnetic field tensor;
      communicating the updated transformed magnetic field tensor to the transformation module; and
      applying an inverse unitary transformation at the processor of the transformation module to the updated transformed magnetic field tensor to generate an updated initial magnetic field tensor in the initial reference frame; and
   using the updated magnetic field tensor in the initial reference frame in an update of the standard FDTD process while running the simulation.

* * * * *